Dec. 15, 1931.  J. F. O'CONNOR  1,836,186
FRICTION SHOCK ABSORBING MECHANISM
Filed May 16, 1929
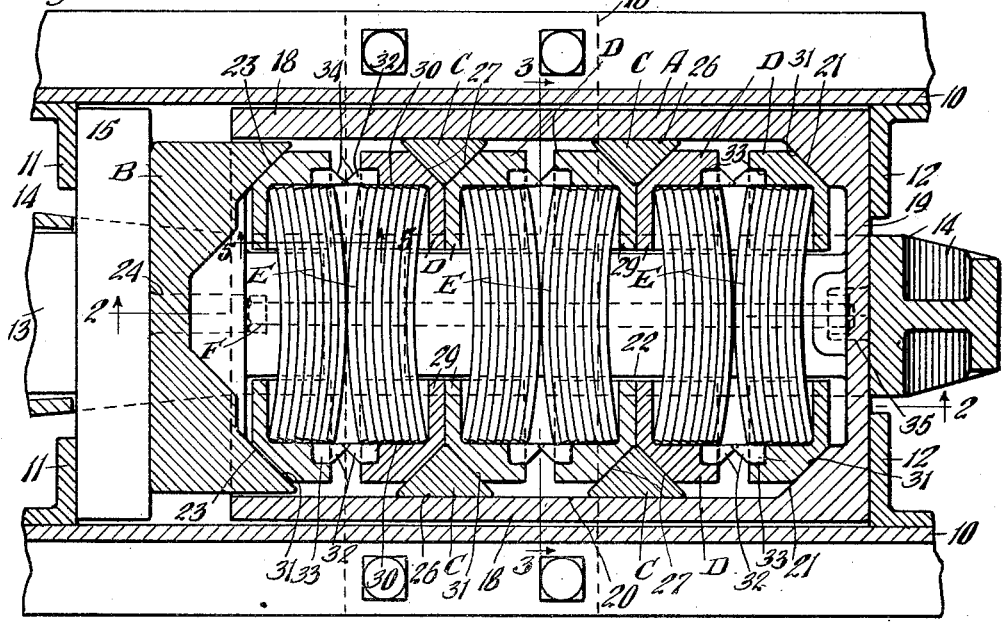
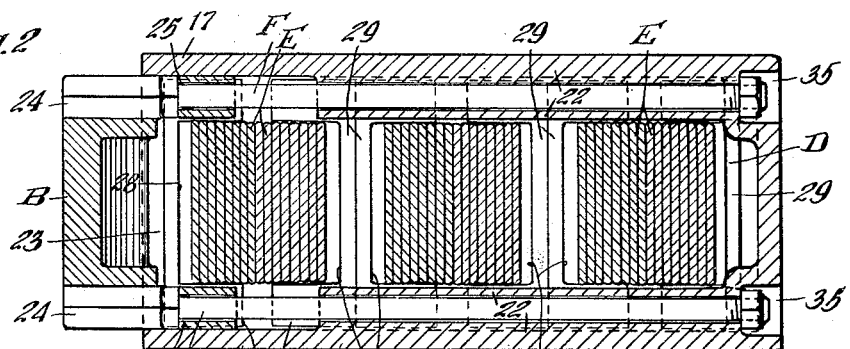
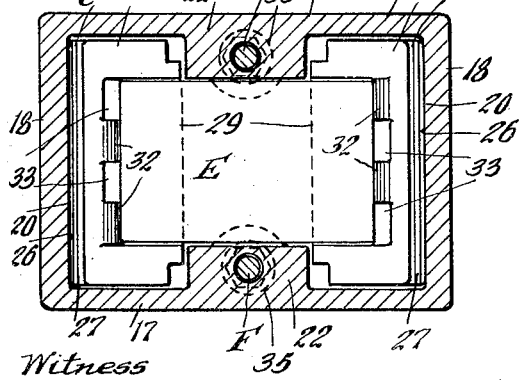
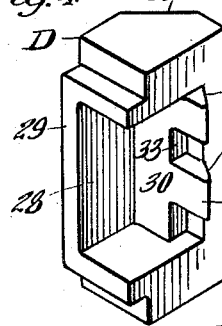
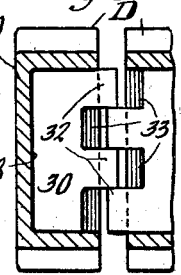
Inventor
John F. O'Connor
By Joseph Harris
His Atty.
Witness
Wm. Geiger Patented Dec. 15, 1931

1,836,186

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed May 16, 1929. Serial No. 363,687.

This invention relates to improvements in friction shock absorbing mechanisms.

One object of the invention is to provide a friction shock absorbing mechanism for railway draft riggings, having high capacity produced by a plurality of coacting wedge and friction elements, wherein easy and certain release of the parts is assured.

A further object of the invention is to provide a friction shock absorbing mechanism including a friction casing and a follower member relatively movable toward each other, and spring resisted friction wedge means cooperating with the casing comprising a plurality of laminated plate springs and cooperating friction wedge members actuated through compression of the plate springs, the plates forming the springs being normally bowed and flexed to straighten the same when placed under compression forces, whereby certain of the friction wedge members are forced apart laterally, thereby sliding the same on the cooperating friction wedge members, the latter being forced to slide on the casing walls during the compression of the mechanism, thereby augmenting the resistance.

A still further object of the invention is to provide a friction shock absorbing mechanism specially adapted for draft riggings of passenger cars, including a friction casing; a main follower; a spring resistance means including a plurality of sets of bowed plate spring members disposed within the casing transversely thereof; a plurality of spring follower members in the form of wedge blocks cooperating with the plate springs; and a plurality of friction wedge blocks cooperating with the first named wedge blocks and having sliding frictional engagement with the casing, wherein the follower and casing are movable toward each other during compression of the mechanism, thereby flexing the spring plates to straighten the same and spread the wedge acting spring follower members laterally apart, thereby forcing the same to slip on the wedge faces of the cooperating friction wedge blocks, the latter sliding on the friction surfaces of the casing due to the contraction of the spring resistance means lengthwise of the mechanism.

A more specific object of the invention is to provide a friction shock absorbing mechanism including a casing having interior, longitudinally disposed friction surfaces; a main follower movable toward and away from the casing; friction wedge blocks having sliding engagement with the friction surfaces of the casing; a plurality of pairs of laminated plate springs arranged transversely of the mechanism, each pair including two sets of curved spring plates with the convex surfaces of the two sets in engagement, whereby pressure applied to the plate springs lengthwise of the mechanism effects flexing of the plates to straighten or flatten the same, thus causing elongation of the laminated plate springs transversely of the mechanism; and wedge blocks cooperating with each laminated plate spring and having wedging engagement with the friction wedge blocks, the wedge blocks being forced laterally outwardly through the flexing action of the laminated plate springs, thereby effecting slippage thereof on the friction wedge blocks, additional friction resistance being had by sliding movement of the friction wedge blocks on the casing wall due to contraction of the laminated plate spring resistance means lengthwise of the mechanism.

Other objects of the invention will more clearly appear from the description and claims hereinafter following.

In the drawings, forming a part of this specification, Figure 1 is a horiozntal, longitudinal, sectional view through the underframe structure at one end of a railway car illustrating my improvements in connection therewith. Figure 2 is a longitudinal, vertical, sectional view of the friction shock absorbing mechanism proper, corresponding substantially to the line 2—2 of Figure 1. Figure 3 is a transverse, vertical, sectional view corresponding substantially to the line 3—3 of Figure 1. Figure 4 is a detailed perspective view of a spring follower member employed in connection with my improved mechanism. And Figure 5 is a vertical, sectional view corresponding substantially to the line 5—5 of Figure 1 illustrating two adjacent spring follower members.

The said drawings 10—10 indicate channel-shaped center or draft sills of a railway car underframe structure to the inner sides of which are secured front stop lugs 11—11 and rear stop lugs 12—12. The inner end portion of the usual coupler shank is designated by 13 and has operatively connected thereto a hooded yoke 14. My improved shock absorbing mechanism and the front main follower 15 are disposed within the yoke and the yoke in turn is supported by a detachable saddle plate 16 secured to the bottom flanges of the draft sills.

My improved shock absorbing mechanism proper comprises broadly a casing A; a main wedge member B; four friction shoes C; six pairs of combined spring follower and wedge members D—D; a main spring resistance means including three pairs of laminated plate springs E—E, E—E, E—E; and a pair of retainer bolts F—F.

The casing A is in the form of a rectangular box-like member having longitudinally disposed, spaced horizontal top and bottom walls 17—17; spaced, vertical, longitudinally extending side walls 18—18 and a transverse, vertical rear end wall 19. The end wall 19 cooperates with the stop lugs 12 in the manner of the usual rear follower. The side walls 18 present longitudinally disposed interior friction surfaces 20—20. At the inner end, the casing A is provided with a pair of opposed wedge faces 21—21 which diverge forwardly of the mechanism, the wedge faces 21 being formed on thickened portions provided at the inner ends of the side walls 18 of the casing. The top and bottom walls 17 are provided with longitudinally disposed, interior central enlargements 22—22 which are in the form of relatively wide ribs and accommodate the retainer bolts.

The main wedge member B is in the form of a block having a transverse flat front face bearing directly on the inner side of the main follower 15. The block B is telescoped within the front end of the casing A and is hollow as shown, having a pair of opposed interior wedge faces 23—23 on opposite sides thereof, the wedge faces 23 diverging inwardly of the mechanism. At the top and bottom sides, the wedge block is provided with central pockets 24—24 adapted to accommodate the heads of the retainer bolts F—F, the pockets presenting transverse abutment shoulders 25—25 at their inner ends adapted to limit outward movement of the wedge block B by engagement with the heads of the retainer bolts.

The friction shoes C which are four in number are arranged in pairs at opposite sides of the mechanism. Each shoe C has a flat outer surface 26 engaging the friction surface 20 at the corresponding side of the casing A. On the inner side, each shoe is provided with a pair of converging wedge faces 27—27 which cooperate with the spring follower members D.

The main spring resistance, which is composed of three pairs of laminated plate springs E—E, has the laminated plate spring elements thereof arranged transversely of the mechanism as most clearly shown in Figure 1. Each pair of laminated plate springs E—E is spaced from the next adjacent pair and the members of each pair are in abutting relation. Each laminated plate spring E comprises a plurality of rectangular plate spring members, which are curved lengthwise and are disposed transversely of the mechanism. The plates of each laminated plate spring are nested, as shown, and have the members thereof curved in a reverse direction to the plates of the other spring member of the pair, the convex surfaces of each pair of laminated plate springs being in abutting relation.

The combined spring follower and wedge members D are arranged in pairs at opposite sides of the mechanism, each pair cooperating with one of the laminated plate springs E. Each member D, as most clearly shown in Figures 1, 5 and 6, is in the form of a block having a pocket 28 adapted to receive the corresponding end portion of the cooperating laminated plate spring. As shown, the pocket 28 has an end wall 29 extending transversely of the mechanism and cooperating with the laminated plate spring in the manner of the usual spring follower. The pocket 28 also has a longitudinally extending flat inner wall 30 which forms an abutment for the outer ends of the plate members of the laminated plate spring. Each member D is also provided with an exterior wedge face 31. The spring follower members D are arranged in front and in back of each pair of laminated plate springs E—E and form front and rear spring follower members therefor. The two pairs of spring follower members D, together with the cooperating pair of plate spring members E, form a combined friction wedge unit which when placed under compression is expanded in a lateral direction. One of the friction wedge units, including the two pairs of spring followers and a pair of laminated plate springs, is interposed between the main wedge member B and the outermost pair of friction shoes C. Another wedge friction unit is interposed between the two pairs of friction shoes C. Still another wedge friction unit is interposed between the innermost pair of friction wedge shoes C and the wedge faces 21 at the inner end of the casing A. The spring follower members D of the friction wedge unit interposed between the member B and the shoes C have the wedge faces 31 thereof engaging respectively the wedge faces 23 of the member B and the front wedge faces of the outer pair of shoes C, the follower members D of the friction wedge unit interposed between the friction shoes C have the wedge faces 31 thereof engaging the adjacent wedge faces 27 of said shoes, and the follower members D of the rearmost friction wedge unit have the wedge faces 31 thereof engaging the inner wedge faces 27 of the adjacent shoes C and the wedges faces 21 of the casing A. In order to maintain the two pairs of spring follower members D associated with each pair of laminated plate springs in proper alinement each member D is provided with a pair of guide lugs 32—32 which cooperate with guide pockets 33—33 of the next adjacent member. As shown most clearly in Figures 5 and 6, the guide pockets 33 of each member D are alternated with the guide members thereof and are so disposed that the guide members 32 of one member D are in alinement with the guide pockets 32 of the adjacent member. The guide members 32 are preferably beveled as indicated at 34 to facilitate entrance thereof into the pockets 33. In addition to forming guide members, the parts 32 also serve to at all times maintain the plates forming the laminated plate springs in assembled relation, the inner sides of the members 32 forming abutments for the opposite ends of the plates. Inasmuch as the members 32 of two adjacent spring followers D overlap in all positions of the parts, it will be appreciated that the spring plates are at all times confined between the same.

The mechanism is held of uniform overall length and assembled by the two retainer bolts F which are disposed respectively at the top and bottom of the casing A and extend lengthwise thereof. The opposite ends of the bolts are anchored respectively to the casing and the main wedge member B, the heads of the bolts being in shouldered engagement with the abutment faces 25 of the member B and the nuts of the bolts being accommodated in pockets 35—35 provided at the inner end of the casing, the shanks of the bolts extending through alined openings in the wedge block B and the enlargements 22 on the top and bottom walls of the casing. When the parts are assembled, the bolts are preferably so adjusted that the laminated plate springs E are under initial compression. As will be evident, with the plate springs under initial compression, there is a tendency for the same to force the spring follower members D into intimate contact with the cooperating wedge faces of the wedge block B, the shoes C and the casing A and hold the shoes in contact with the friction surfaces of the casing, thus compensating for wear of the wedge faces and friction surfaces of the mechanism.

The operation of my improved shock absorbing mechanism is as follows. Upon either a draft or buffing action being applied to the friction shock absorbing mechanism, the front follower 15 and the casing A will be moved inwardly relatively to each other. Upon inward movement of the follower 15, the main wedge member B will be forced inwardly of the casing A, thereby forcing the front pair of spring follower members D inwardly also and compressing the outer pair of laminated plate springs. Pressure will be communicated through the spring members to the rear pair of spring followers which will be wedged against the outer pair of friction shoes C, forcing the latter rearwardly and setting up a wedging action between the same and the pair of front spring follower members D of the intermediate pair of laminated plate springs. The force will be communicated from the springs E to the rear pair of spring follower members D cooperating therewith and set up a wedging action between the same and the innermost pair of friction shoes C, forcing the latter rearwardly and setting up a wedging action between the same and the front pair of spring followers D of the rearmost set of laminated plate springs. The force will be transmitted through the last named laminated plate springs to the pair of spring followers at the rear end of the casing, thereby setting up a wedging action between the same and the wedge faces 21. As will be evident, during the compression action the curved spring plates will be straightened or flattened, thereby spreading apart the spring followers D at opposite sides of the mechanism and causing the same to slide laterally outwardly on the cooperating wedge faces of the wedge member B, the shoes C and the casing A. Inasmuch as the overall dimension of the three pairs of laminated plate springs lengthwise of the gear is decreased during the straightening or flattening of the plates, the friction shoes C will slide inwardly on the friction surfaces of the casing during compression of the mechanism, thereby augmenting the resistance offered. Additional frictional resistance will also be had between the plate members of each laminated plate spring due to slippage between the cooperating surfaces of these plates while the same are being flexed. Compression of the mechanism will be limited by engagement of the main follower 15 with the outer end of the casing A, whereupon the actuating force is transmitted directly to the casing, relieving the laminated plate springs from excessive compression.

In release of the mechanism when the actuating force is reduced, the tendency of the laminated plate spring members to assume their normal curved or bowed condition will effect restoration of the spring follower members D and the friction shoes C together with the main wedge member D to the former full release position, outward movement of the wedge member B being limited by the retainer bolts F—F.

From the preceding description taken in connection with the drawings, it will be evident that I have provided an exceedingly simple and efficient friction shock absorbing mechanism, having relatively high capacity and assured release, the cooperating wedge faces of the mechanism being of such angularity that the cooperating wedge members are free to drop away from each other as soon as the actuating force is reduced in release.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a plurality of sets of blocks, each set comprising two adjacent pairs, the blocks of each pair being laterally separable and adjacent pairs being movable toward each other lengthwise of the mechanism; of friction shoes on which said blocks are slidable; friction members on which said shoes are slidable to create friction; front and rear follower members movable toward and away from each other in a direction lengthwise of the mechanism; and spring resistance means interposed between said followers and engaging the blocks of said pairs, said spring resistance means being compressed longitudinally and expanded laterally of the mechanism by movement of the follower members toward each other to force said blocks apart and effect sliding movement thereof on the friction shoes and sliding movement of the shoes on said members.

2. In a friction shock absorbing mechanism, the combination with front and rear followers relatively movable toward and away from each other in a direction lengthwise of the mechanism; of spring means interposed between said followers and adapted to be compressed during relative approach of the followers, said spring means being expandable laterally of the mechanism upon being compressed lengthwise of the same; and friction means including a member having a longitudinally disposed friction surface, blocks and shoes, said shoes being movable toward each other on said surface during compression of the mechanism, said blocks being forced laterally outwardly by lateral expansion of the spring means and forced to slide on said shoes.

3. In a friction shock absorbing mechanism, the combination with friction means including a member having opposed longitudinally disposed friction surfaces, of friction shoes having sliding movement on said surfaces, and wedge blocks having wedging engagement with said shoes, said blocks being movable laterally outwardly on said shoes of spring resistance means expandable laterally upon being compressed lengthwise of the mechanism for effecting relative movement of said shoes and blocks; and follower acting means for effecting compression of said spring resistance means lengthwise of the mechanism and movement of said shoes toward each other and said friction member.

4. In a friction shock absorbing mechanism, the combination with friction means, including members disposed at opposite sides of the mechanism, a plurality of sets of spaced shoes having sliding engagement on said members, and blocks arranged at opposite sides of the mechanism and having engagement with the said shoes on inclined surfaces; of transversely disposed bowed spring plates interposed between the wedge blocks at opposite sides of the mechanism, said spring plates being flexed to straighten the same when compressed, thereby forcing said elements apart and effecting relative approach of said sets of shoes lengthwise of the mechanism; and means at opposite ends of the mechanism movable toward each other to compress said spring plates.

5. In a friction shock absorbing mechanism, the combination with a follower casing having opposed interior friction surfaces; of a plurality of sets of friction shoes, the members of each set being disposed at opposite sides of the casing and movable lengthwise of said friction surfaces each shoe having front and rear wedge faces; wedge blocks at opposite sides of the casing having wedging engagement with said front and rear wedge faces of the shoes; transversely disposed bowed spring plates within the casing interposed between the wedge blocks at opposite sides of the mechanism; and a follower member, said member and casing being relatively movable toward and away from each other, said follower member and casing cooperating with the plates to compress the same lengthwise of the mechanism, thereby effecting flattening thereof.

6. In a friction shock absorbing mechanism, the combination with a casing having interior opposed friction surfaces; of a plurality of transversely disposed laminated plate springs within the casing, the plates of each spring being bowed and the convex outer surface of each plate spring engaging the outer convex surface of the next adjacent plate spring; longitudinally disposed pairs of wedge blocks, the blocks of one pair cooperating with one of said laminated plate springs, and the blocks of another pair cooperating with the next adjacent plate spring, each laminated plate spring having the opposite ends thereof engaging the corresponding pair of blocks; friction shoes slidable lengthwise on the friction surfaces of the casing and having wedging engagement with the wedge blocks; and follower means cooperating with said laminated plate springs to flex the same to effect lateral elongation thereof to spread said wedge blocks apart.

7. In a friction shock absorbing mechanism, the combination with a pair of laminated spring plate members, the plate members of each being disposed transversely of the mechanism and curved transversely, the pair of laminated plate springs being disposed adjacent each other with the convex sides thereof in abutment; two pairs of wedge blocks at opposite sides of the mechanism, the blocks of each pair being engaged by the opposite ends of each laminated plate spring; and members having wedge faces cooperating with each pair of wedge blocks, said wedge members of said two pairs of blocks being movable toward each other lengthwise of the mechanism during compression of the mechanism to effect compression of said laminated plate springs and lateral outward movement of the wedge blocks.

8. In a friction shock absorbing mechanism, the combination with a pair of laminated plate springs, the plate members of which are curved transversely of the mechanism and the outer convex surfaces of said two plate springs being in abutment; a pair of spring follower blocks cooperating with each laminated plate spring, said blocks of each pair being disposed at opposite sides of the mechanism and engaging the concave sides of said spring plates, each block having longitudinally disposed abutment faces engaging the corresponding end of the cooperating laminated plate spring; and wedge members having wedging engagement with the blocks for forcing the blocks of the pair of laminated plate springs toward each other lengthwise of the mechanism, thereby compressing said springs and flattening the same to effect lateral separation of the blocks at opposite sides of the mechanism.

9. In a friction shock absorbing mechanism, the combination with followers relatively movable toward and away from each other lengthwise of the mechanism; of laterally, inwardly acting front and rear wedge means at opposite sides of the mechanism; said front and rear wedge means being movable toward each other upon relative approach of said followers; a plurality of pairs of wedge blocks, the members of each pair of which are disposed at opposite sides of the mechanism, one of said pairs of blocks cooperating with the front wedge means and the other pair cooperating with the rear wedge means; and transversely arranged laminated plate springs interposed between each pair of wedge blocks, the plates of each spring being transversely curved and said springs being in abutment and each of said wedge blocks having a transversely disposed spring follower portion cooperating with the corresponding laminated plate spring.

10. In a friction shock absorbing mechanism, the combination with a casing having opposed interior friction surfaces; of a main follower, said follower and casing being movable relatively toward and away from each other, said main follower having opposed laterally, inwardly acting wedge faces and said casing also having opposed laterally, inwardly acting wedge faces; friction shoes disposed at opposite sides of the mechanism and cooperating with the friction surfaces of the casing, said shoes presenting laterally, inwardly acting wedge faces; laminated plate springs arranged in pairs, said pairs of springs being in abutment, the plates of each spring being curved and disposed transversely of the mechanism; and a pair of spring follower blocks cooperating with each laminated plate spring and arranged on opposite sides of the mechanism, said blocks having longitudinal abutment faces engaging the opposite ends of the spring plates, and each block having wedging engagement with one of said wedge faces.

11. In a friction shock absorbing mechanism, the combination with a follower casing having opposed interior friction surfaces and a pair of opposed interior wedge faces; of friction shoes at opposite sides of the mechanism, each cooperating with one of said casing friction surfaces, and each having front and rear wedge faces on the inner sides thereof; a wedge means movable inwardly of the casing, said wedge means having opposed interior wedge faces; a plurality of spring follower blocks arranged in pairs at opposite sides of the mechanism, each spring block having wedging engagement with one of said wedge faces; and laminated plate springs arranged in adjacent pairs and cooperating with the opposed blocks of one pair, said laminated plate springs each including a plurality of transversely curved plate members and each pair of laminated plate springs having the convex faces thereof in abutment.

12. In a friction shock absorbing mechanism, the combination with a follower casing closed at one end and open at the opposite end, said casing having interior opposed wedge faces at said closed end and longitudinally disposed interior friction surfaces on the opposite side walls thereof; of wedge means at the open end of the casing and movable inwardly of the same, said wedge means having opposed interior wedge faces; two spaced pairs of friction shoes cooperating with the friction surfaces of said casing, the members of each pair being arranged on opposite sides of the mechanism and each having front and rear wedge faces on the inner sides thereof; a plurality of friction wedge units, each including front and rear pairs of spring follower blocks and a pair of laminated front and rear plate springs cooperating respectively with said pairs of spring follower blocks, the blocks of each pair having longitudinally disposed abutment faces engaging the opposite ends of the plates of the corresponding laminated plate spring and each having an outer wedge face, the plates of each spring being curved transversely of the mechanism and the convex surfaces of said pair of laminated plate springs being arranged adjacent and in abutment with each other, one of said friction wedge units being interposed between the wedge faces of the casing and one of said pairs of shoes with the wedge faces of the spring follower blocks thereof cooperating with said casing and shoe wedge faces, another of said friction wedge units being interposed between the two pairs of friction shoes with the wedge faces of the spring follower blocks thereof in wedging engagement with the wedge faces of the shoes, and another of said wedge units being interposed between the wedge means and the adjacent pair of shoes with the wedge faces of the spring follower blocks thereof in wedging engagement with the wedge faces of said pair of shoes and the wedge means.

13. In a friction shock absorbing mechanism, the combination with front and rear follower members relatively movable toward and away from each other, each follower having opposed interior wedge faces; of means between said followers and movable with one of said followers having fixed, interior opposed friction surfaces; friction shoes at opposite sides of the mechanism cooperating with the opposed friction surfaces of said means, each of said shoes having front and rear wedge faces on the inner side thereof; laminated plate springs arranged transversely of the mechanism, said plate springs being arranged in abutting pairs and the plates of each spring being curved transversely of the mechanism; a pair of spring follower blocks cooperating with each laminated plate spring, said follower blocks of each pair being disposed at opposite sides of the mechanism and the two pairs of spring blocks cooperating with each pair of laminated plate springs being arranged respectively in front and in back of said pair of springs, each block having a longitudinally disposed face engaging the corresponding end of the cooperating laminated plate spring and also having wedging engagement with one of said wedge faces.

14. In a friction shock absorbing mechanism, the combination with a casing having opposed longitudinally extending interior friction surfaces; of a plurality of wedge friction units within the casing, each unit including front and rear pairs of spring follower blocks and front and rear laminated plate spring members interposed between said pairs of blocks, the laminated plate springs being disposed transversely of the mechanism, the plates of each spring being curved transversely and the plates of one of said springs being curved reversely to those of the other spring and said springs being in abutment, the blocks of each pair being separable laterally and having abutment faces engaging the opposite ends of the adjacent laminated plate spring, each block having an outer wedge face; wedge means movable inwardly of the casing and having interior opposed wedge faces engaging the wedge faces of the outer pair of spring blocks of one of said wedge units; opposed interior wedge faces on the casing having wedging engagement with the rear pair spring follower blocks of another of said units; and friction shoes at opposite sides of the mechanism having frictional engagement with the opposed friction surfaces of the casing and having wedge means thereon engaging with the remaining front and rear pairs of spring follower blocks of the wedge friction units.

15. In a friction shock absorbing mechanism, the combination with a casing having interior opposed friction surfaces; of a plurality of transversely disposed laminated plate springs within the casing, the plates of each spring being bowed, said laminated plate springs being arranged in abutting pairs, the plates of adjacent laminated plate springs being reversely curved; a pair of wedge blocks cooperating with one of the laminated plate springs of said pair, a second pair of wedge blocks cooperating with the other spring of said pair, each plate spring having the opposite ends thereof engaging said blocks; friction shoes slidable lengthwise on the friction surfaces of the casing and each having wedging engagement with two of said wedge blocks, and follower means cooperating with said laminated plate springs to flex the same to effect lateral elongation thereof to spread said wedge blocks apart.

16. In a friction shock absorbing mechanism, the combination with a pair of laminated plate spring members, the plate members of each being disposed transversely of the mechanism and curved in a transverse direction, the pair of laminated plate springs being disposed adjacent each other in engagement, the plates of one of said laminated plate springs being curved reversely with respect to the plates of the other laminated plate spring of said pair; a pair of wedge blocks at opposite sides of the mechanism engaged by the opposite ends of each laminated plate spring; and wedge means cooperating with each pair of wedge blocks, said wedge means of said two pairs of blocks being movable toward each other during compression of the mechanism to effect compression of said laminated plate springs and lateral outward movement of said wedge blocks.

17. In a friction shock absorbing mechanism, the combination with a pair of laminated plate springs, the plate members of which are curved transversely of the mechanism, the plates of each of said springs being reversely curved with respect to the plates of the other spring of said pair, said pair of springs being in bearing engagement; of a pair of spring follower blocks cooperating with each laminated plate spring, said spring follower blocks of said pair of springs being disposed on opposite sides thereof and said blocks of each pair being disposed at opposite sides of the mechanism, each block having an abutment face, the abutment faces of each pair engaging the opposite ends of the corresponding laminated plate spring; and wedge acting means having wedging engagement with the spring blocks for forcing said spring blocks of the pair of laminated plate springs toward each other lengthwise of the mechanism, thereby compressing said springs and flattening the same to effect lateral separation of said blocks at opposite sides of the mechanism.

18. In a friction shock absorbing mechanism, the combination with followers relatively movable toward and away from each other lengthwise of the mechanism; of wedge means movable with each follower; said wedge means of each follower presenting inwardly acting wedge faces; two pairs of wedge blocks, the members of each pair of which are disposed at opposite sides of the mechanism cooperating with the opposed wedge faces of the wedge means movable with each follower; and a pair of transversely arranged laminated plate springs, one of said springs being interposed between the members of each pair of wedge blocks, the plates of each spring being transversely bowed and said pair of springs being arranged with the plates thereof reversely curved, said pair of laminated springs being in abutment and each of said wedge blocks having a transversely disposed spring follower portion cooperating with the corresponding laminated plate spring.

In witness that I claim the foregoing I have hereunto subscribed my name this 15th day of May, 1929.

JOHN F. O'CONNOR.